US008674009B2

(12) United States Patent
Diekstall et al.

(10) Patent No.: US 8,674,009 B2
(45) Date of Patent: Mar. 18, 2014

(54) PROCESS FOR CONTROLLING THE SCORCH TIME (ST) IN THE VULCANIZATION OF SILICIC ACID-FILLED RUBBER BLENDS

(75) Inventors: Klaus Diekstall, Goslar (DE); Burkhardt Jahn, Bad Harzburg (DE); Peter Schubert, Liebenburg (DE); Sven Hessdoefer, Karlburg (DE)

(73) Assignee: Grillo Zinkoxid GmbH, Goslar (DE)

( * ) Notice: Subject to any disclaimer, the term of this patent is extended or adjusted under 35 U.S.C. 154(b) by 0 days.

(21) Appl. No.: 11/998,455

(22) Filed: Nov. 30, 2007

(65) Prior Publication Data

US 2008/0153989 A1    Jun. 26, 2008

(30) Foreign Application Priority Data

Nov. 30, 2006 (EP) .................................. 06125114

(51) Int. Cl.
    *C08F 8/00* (2006.01)
(52) U.S. Cl.
    USPC .......................................... 524/432; 524/342
(58) Field of Classification Search
    USPC ....................................................... 524/432
    See application file for complete search history.

(56) References Cited

U.S. PATENT DOCUMENTS

| 6,433,064 | B1 * | 8/2002 | Gorl et al. ..................... 524/492 |
| 6,548,594 | B2 * | 4/2003 | Luginsland et al. .......... 524/571 |
| 6,616,558 | B2 * | 9/2003 | South ............................. 474/260 |
| 6,624,230 | B2 * | 9/2003 | Luginsland ................... 524/492 |

FOREIGN PATENT DOCUMENTS

| EP | 1 142 896   | 10/2001 |
| WO | WO 01/88027 | 11/2001 |

OTHER PUBLICATIONS

G. Heideman et al., Influence of Zinc Oxide during Different Stages of Sulfur Vulcanization Elucidated by Model Compound Studies, Journal of Applied Polymer Science, vol. 95, p. 1388-1404, Mar. 15, 2005.*
Ullmann's Encyclopedia of Industrial Chemistry: Rubber, 4. Chemicals and Additives, 2004.*

* cited by examiner

*Primary Examiner* — Doris Lee
(74) *Attorney, Agent, or Firm* — Jacobson Holman PLLC

(57) ABSTRACT

A process for controlling the scorch time (ST) in the vulcanization of vulcanizable blends containing a composition to be vulcanized, hydrophobized silicic acid and zinc oxide particles wherein the scorch time control is effected by the size and number of zinc oxide particles (amount). The process of the invention is also suitable for preparing vulcanized rubber articles.

10 Claims, No Drawings

PROCESS FOR CONTROLLING THE SCORCH TIME (ST) IN THE VULCANIZATION OF SILICIC ACID-FILLED RUBBER BLENDS

The present invention pertains to a process for controlling the scorch time (ST) in the vulcanization of vulcanizable blends and the use thereof in a process for preparing vulcanized rubber articles.

The scorch time of a rubber blend is a measure of the heat stability of the blend. The processing conditions of a rubber blend may be derived from its heat stability. In principle, during processing of rubber mixtures they are exposed to high mechanical and thus thermal stresses to achieve a good distribution of the blend components on the one hand and high throughputs on the other hand.

Besides the processing conditions as employed, scorch time is of great importance in the vulcanization of tyres. A tyre consists of a multitude of different blends, each of which fulfilling different functions and thus having its own formulation. The separate blends are combined and jointly vulcanized in a press. Then, all blends are required to have approximately the same scorch time and attain their optimum crosslinking density to obtain the specific properties of the blend.

Generally, the vulcanizing properties are adjusted by varying the accelerators and/or accelerator amounts and using retarders.

In particular, silica-silane-filled systems have a fast scorch. In addition to carbon black, silica (silicic acid) is an enhancing filler which improves the mechanical properties of a rubber blend. The use of silica-silane systems enabled an improvement of the property profile of a tyre with respect to grip and adhesion in the wet and the rolling resistance.

The improvement of the property profile results from the different reinforcing mechanisms of both of said fillers. Like the polymers of tyre rubbers, carbon blacks are non-polar and form secondary bonds with the polymer. In addition to this reinforcement, fillers form a filler-filler network also contributing to reinforcement from a certain filling level (percolation threshold) on.

Contrary to carbon black, silica is a polar filler. Due to the polarity thereof, a very strong filler-filler network is formed. However, the bonding of the polymers to the silica surface is very weak. A breakthrough was the use of silanes which form covalent bonds between the silica surface and the polymer.

Due to the direct bonding of the polymer and the filler the mobility of the polymer chains is restricted which results in a decrease of rubber elasticity. Due to the decreased rubber elasticity, less energy is converted into heat under dynamic stress resulting in an improved rolling resistance.

Preferably, silica-silane-filled systems are used in tread blends for passenger car tyres. In a passenger car tyre, the weight content of said tread blend is about 50%.

A technical problem forming the basis of the invention was to control the scorch time in the vulcanization of vulcanizable blends to provide the manufacturer with a greater flexibility in the production of vulcanized articles, in particular tyres containing silica-silane-filled products.

The problem is solved by a process for controlling the scorch time (ST) in the vulcanization of vulcanizable blends containing a composition to be vulcanized, hydrophobized silicic acid and zinc oxide particles wherein the scorch time control is effected by the size and number (amount in phr—parts per hundred) of zinc oxide particles.

According to the invention the scorch time is prolonged in the presence of smaller zinc oxide particles as compared to the presence of larger zinc oxide particles. Larger zinc oxide particles within the used zinc oxide particle fraction result in a scorch time reduction relative to the presence of higher proportions of smaller zinc oxide particles.

Typically, the zinc oxide particles which may be used to control the scorch time have a particle size of from about 10 nm to about 10 µm, in particular of from about 100 nm to about 10 µm.

The stated sizes are based on measurements with a testing device for particle analysis using scattered light. Here, the particle size calculation is based on the Mie theory describing the interaction between light and matter (DIN/ISO 13320).

The surface is measured according to DIN 66131 (determination of the specific surface of solids by gas adsorption according to Brunauer, Emmett and Teller) or according to DIN 66132 (determination of the specific surface of solids by nitrogen adsorption-single-point difference method according to Haul and Dümbgen).

Typically, the zinc oxide particles which may be used for controlling the scorch time have a specific surface area of from about 1 $m^2$ $m^2/g$ to about 100 $m^2$ $m^2/g$, in particular from about 3 $m^2$ $m^2/g$ to about 20 $m^2$ $m^2/g$.

In one embodiment of the process according to the invention, the composition to be vulcanized is a diene rubber.

For example, diene rubbers selected from the group consisting of natural rubber (NR)
polybutadiene (BR)
polyisoprene (IR)
solution styrene butadiene rubber (SSBR)
emulsion styrene butadiene rubber (ESBR)
acrylonitrile butadiene rubber (NBR)
chloroprene rubber (CR)
halogenated butyl rubber (BIIR, CIIR)
ethylene propylene rubber (EPDM)

are used.

Preferably, the process according to the invention uses silanized hydrophobized silicic acids. In particular, a silicic acid silanized by a bi- or monofunctional silanizing agent may be used as a hydrophobized silicic acid.

A bifunctional silane to be used according to the invention is a sulfur-containing organosilane for use in rubber industry in combination with fillers having silanol groups. Said silane reacts with fillers having silanol groups during mixing and with the polymer during vulcanization to form covalent chemical bonds (bifunctional).

However, a monofunctional organosilane will only react with the silanol groups of the filler. This will result in the formation of a chemical bond to the filler surface.

The control process of the invention may be applied to a process for preparing vulcanizable rubber articles.

The invention will be illustrated in more detail in the following examples.

Typical silicic acid-filled tread blends used in today's tyre industry were investigated.

EXAMPLE 1

Influence of various zinc oxides having different particle sizes or BET surfaces on the scorch time of a silicic acid-filled blend. In this experiment the silicic acid was pretreated with a bifunctional silane (silane X50S ex Degussa).

|  | phr | phr | phr |
|---|---|---|---|
| BUNA VSL 5025-0 HM | 50.0 | 50.0 | 50.0 |
| BUNA CB 24 | 25.0 | 25.0 | 25.0 |
| SMR-L | 25.0 | 25.0 | 25.0 |
| ULTRASIL 7000 GR | 75.0 | 75.0 | 75.0 |
| Silane X 50 S | 12.0 | 12.0 | 12.0 |
| Stearic acid | 1.0 | 1.0 | 1.0 |
| Processing oil 450 | 30.0 | 30.0 | 30.0 |
| Sulfur | 1.25 | 1.25 | 1.25 |
| Accelerator CBS | 1.8 | 1.8 | 1.8 |
| Accelerator DPG | 2.0 | 2.0 | 2.0 |
| Type 1 zinc oxide | 1.0 | — | — |
| Type 2 zinc oxide | — | 1.0 | — |
| Type 3 zinc oxide | — | — | 1.0 |

The blend is prepared in the following sequence:
The masterbatch was prepared in a two-stage procedure using an internal mixer (Werner & Pfleiderer GK, 1.5E).
The parameters of the masterbatch preparation were as follows:
Parameters of the Internal Mixer (Stage 1):
Filling level: 70%
Starting temperature: 60° C.
Rotor speed: 60 rpm
Mixing Cycle:
0'00"-1'00": polymers (Buna VSL 5025-0 HM, Buna CB 24, SMR-L)
1'00"-3'30": ⅔ silicic acid (Ultrasil 7000 GR), ⅔ silane (X50S), stearic acid
3'30"-7'00": ⅓ silicic acid (Ultrasil 7000 GR), ⅓ silane (X50S), processing oil (processing oil 450)
Parameters of the GK 1.5E (Stage 2):
Filling level: 70%
Starting temperature: 60° C.
Rotor speed: 60 rpm
Mixing time: 5 min Sulfur and vulcanization accelerators were added to the masterbatch on a roll mill in a third mixing stage.
Parameters of the Roll Mill (Stage 3):
Roll temperature: 60° C.
Roll speed: 16:12 rpm
Mixing time: 10 min
0'00": sulfur, accelerator CBS, accelerator DPG Subsequently, the masterbatch was partitioned and various zinc oxide types 1, 2 and 3 were incorporated on a laboratory roll mill.
Results

| Zinc oxide | Type 1 | Type 2 | Type 3 |
|---|---|---|---|
| Scorch time Ts5/min | 10.42 | 11.17 | 12.98 |
| KGV $d_{50}$/μm | 1.25 | 1.02 | 0.22 |
| BET surface/$m^2 \ast g^{-1}$ | 3.8 | 5.6 | 8.8 |

EXAMPLE 2

Monofunctional Silane

Dependency of scorch time on the amount of the employed zinc oxide type.
The constituent amounts of zinc oxide were increased by 0.5 phr each. The silicic acid was pretreated with a monofunctional silane (silane Si 203 ex Degussa).
Type 1 zinc oxide having a $d_{50}$ value of 1.25 μm and a BET surface of 3.8 $m^2 g^{-1}$ was used.

Batch 2

|  | phr | phr | phr | phr | phr | phr | phr | phr | phr | phr |
|---|---|---|---|---|---|---|---|---|---|---|
| BUNA VSL 5025-0 HM | 50.0 | 50.0 | 50.0 | 50.0 | 50.0 | 50.0 | 50.0 | 50.0 | 50.0 | 50.0 |
| BUNA CB 24 | 25.0 | 25.0 | 25.0 | 25.0 | 25.0 | 25.0 | 25.0 | 25.0 | 25.0 | 25.0 |
| SMR-L | 25.0 | 25.0 | 25.0 | 25.0 | 25.0 | 25.0 | 25.0 | 25.0 | 25.0 | 25.0 |
| ULTRASIL 7000 GR | 75.0 | 75.0 | 75.0 | 75.0 | 75.0 | 75.0 | 75.0 | 75.0 | 75.0 | 75.0 |
| Carbon black N330 | 6.0 | 6.0 | 6.0 | 6.0 | 6.0 | 6.0 | 6.0 | 6.0 | 6.0 | 6.0 |
| Silane Si 203 | 4.6 | 4.6 | 4.6 | 4.6 | 4.6 | 4.6 | 4.6 | 4.6 | 4.6 | 4.6 |
| Stearic acid | 1.0 | 1.0 | 1.0 | 1.0 | 1.0 | 1.0 | 1.0 | 1.0 | 1.0 | 1.0 |
| Processing oil 450 | 30.0 | 30.0 | 30.0 | 30.0 | 30.0 | 30.0 | 30.0 | 30.0 | 30.0 | 30.0 |
| Sulfur | 1.25 | 1.25 | 1.25 | 1.25 | 1.25 | 1.25 | 1.25 | 1.25 | 1.25 | 1.25 |
| Accelerator | 1.8 | 1.8 | 1.8 | 1.8 | 1.8 | 1.8 | 1.8 | 1.8 | 1.8 | 1.8 |
| Accelerator CPCPS | 2.0 | 2.0 | 2.0 | 2.0 | 2.0 | 2.0 | 2.0 | 2.0 | 2.0 | 2.0 |
| Type 1 zinc oxide | 0.0 | 0.5 | 1.0 | 1.5 | 2.0 | 2.5 | 3.0 | 4.0 | 5.0 | 6.0 |

The Blend was Prepared in the Following Sequence

The masterbatch was prepared in two steps using an internal mixer (Werner & Pfleiderer GK 1.5E).
The parameters of the masterbatch preparation were as follows:
Parameters of the Internal Mixer (Stage 1):
Filling level: 70%
Starting temperature: 60° C.
Rotor speed: 60 rpm
Mixing Cycle:
0'00"-1'00": polymers (Buna VSL 5025-0 HM, Buna CB24, SMR-2)
1'00"-3'30": ⅔ silicic acid (Ultrasil 7000 GR), ⅔ silane (Si 203), stearic acid, carbon black N330
3'30"-7'00": ⅓ silicic acid (Ultrasil 7000 GR), ⅓ silane (Si 203), processing oil (processing oil 450)
Parameters of GK 1.5E (Stage 2):

Filling level: 70%
Starting temperature: 60° C.
Rotor speed: 60 rpm
Mixing time: 5 min Sulfur and vulcanization accelerators were added to the masterbatch on a roll mill in a third mixing stage.
Parameters of the Roll Mill (Stage 3):
Roll temperature: 60° C.
Roll speed: 16:12 rpm
Mixing time: 10 min
0'00": sulfur, accelerator CBS, accelerator DPG Subsequently, the masterbatch was partitioned and zinc oxide was incorporated in various concentrations.
Results

|  | Type 1 ZnO/phr | | | | | | | | | |
|---|---|---|---|---|---|---|---|---|---|---|
|  | 0.0 | 0.5 | 1.0 | 1.5 | 2.0 | 2.5 | 3.0 | 4.0 | 5.0 | 6.0 |
| Ts5/min | 7.96 | 10.9 | 13.78 | 15.39 | 17.08 | 17.78 | 18.32 | 18.8 | 19.66 | 20.59 |

EXAMPLE 3

Bifunctional Silane

Dependency of scorch time on the amount of used zinc oxide type.

The constituent amounts of zinc oxide were increased by 0.5 phr each. The silicic acid was pretreated with a bifunctional silane (silane X50S ex Degussa).

The type 3 zinc oxide having a $d_{50}$ value of 0.22 μm and a BET surface of 8.8 $m^2 \cdot g^{-1}$ was used.

|  | phr | phr | phr | phr | phr | phr | phr | phr | phr | phr |
|---|---|---|---|---|---|---|---|---|---|---|
| BUNA VSL 5025-0 HM | 50.0 | 50.0 | 50.0 | 50.0 | 50.0 | 50.0 | 50.0 | 50.0 | 50.0 | 50.0 |
| BUNA CB 24 | 25.0 | 25.0 | 25.0 | 25.0 | 25.0 | 25.0 | 25.0 | 25.0 | 25.0 | 25.0 |
| SMR-L | 25.0 | 25.0 | 25.0 | 25.0 | 25.0 | 25.0 | 25.0 | 25.0 | 25.0 | 25.0 |
| ULTRASIL 7000 GR | 75.0 | 75.0 | 75.0 | 75.0 | 75.0 | 75.0 | 75.0 | 75.0 | 75.0 | 75.0 |
| Silane X 50 S | 12.0 | 12.0 | 12.0 | 12.0 | 12.0 | 12.0 | 12.0 | 12.0 | 12.0 | 12.0 |
| Stearic acid | 1.0 | 1.0 | 1.0 | 1.0 | 1.0 | 1.0 | 1.0 | 1.0 | 1.0 | 1.0 |
| Processing oil 450 | 30.0 | 30.0 | 30.0 | 30.0 | 30.0 | 30.0 | 30.0 | 30.0 | 30.0 | 30.0 |
| Sulfur | 1.25 | 1.25 | 1.25 | 1.25 | 1.25 | 1.25 | 1.25 | 1.25 | 1.25 | 1.25 |
| Accelerator | 1.8 | 1.8 | 1.8 | 1.8 | 1.8 | 1.8 | 1.8 | 1.8 | 1.8 | 1.8 |
| Accelerator CPCPS | 2.0 | 2.0 | 2.0 | 2.0 | 2.0 | 2.0 | 2.0 | 2.0 | 2.0 | 2.0 |
| Type 3 zinc oxide | 0.0 | 0.5 | 1.0 | 1.5 | 2.0 | 2.5 | 3.0 | 4.0 | 5.0 | 6.0 |

Batch 3

The Blend was Prepared in the Following Sequence:

The masterbatch was prepared in two steps using an internal mixer (Werner & Pfleiderer GK 1.5E).

The parameters of the masterbatch preparation were as follows:
Parameters of the Internal Mixer (Stage 1):
Filling level: 70%
Starting temperature: 60° C.
Rotor speed: 60 rpm
Mixing Cycle:
0'00"-1'00": polymers (Buna VSL 5025-0 HM, Buna CB 24, SMR-L)
1'00"-3'30": ⅔ silicic acid (Ultrasil 7000 GR), ⅔ silane (X50S), stearic acid
3'30"-7'00": ⅓ silicic acid (Ultrasil 7000 GR), ⅓ silane (X50S), processing oil (processing oil 450)
Parameters of GK 1.5E (Stage 2):
Filling level: 70%
Starting temperature: 60° C.
Rotor speed: 60 rpm
Mixing time: 5 min Sulfur and vulcanization accelerators were added to the masterbatch on a roll mill in a third mixing stage.
Parameters of the Roll Mill (Stage 3):
Roll temperature: 60° C.
Roll speed: 16:12 rpm
Mixing time: 10 min
0'00": sulfur, accelerator CBS, accelerator DPG Subsequently, the masterbatch was partitioned and zinc oxide was incorporated in various concentrations.
Results

|  | Type 3 ZnO/phr | | | | | | | | | |
|---|---|---|---|---|---|---|---|---|---|---|
|  | 0.0 | 0.5 | 1.0 | 1.5 | 2.0 | 2.5 | 3.0 | 4.0 | 5.0 | 6.0 |
| Ts5/min | 6.37 | 9.44 | 12.98 | 15.63 | 14.62 | 15.28 | 14.71 | 14.90 | 15.86 | 15.53 |

The invention claimed is:

1. In a process of vulcanizing a vulcanizable blend, the blend comprising a composition to be vulcanized, hydrophobized silicic acid, and zinc oxide particles, the improvement comprising controlling scorch time (ST) of the vulcanizing by adjusting total surface area of zinc oxide particles in the blend, wherein increasing the total surface area prolongs the scorch time and decreasing the total surface area shortens the scorch time, wherein the particle size is from about 10 nm to about 10 μm.

2. The vulcanizing process according to claim 1, wherein the particle size is from about 100 nm to about 10 μm.

3. The vulcanizing process according to claim 1, wherein the zinc oxide particles have a specific surface area of from about 1 $m^2*g^{-1}$ to about 100 $m^2*g^{-1}$.

4. The vulcanizing process according to claim 1, wherein the zinc oxide particles have a specific surface area of from about 3 $m^2*g^{-1}$ to about 20 $m^2*g^{-1}$.

5. The vulcanizing process according to claim 1 wherein the composition to be vulcanized is a diene rubber.

6. The vulcanizing process according to claim 1, wherein the composition to be vulcanized is a diene rubber selected from the group consisting of natural rubber (NR), polybutadiene (BR), polyisoprene (IR), solution styrene butadiene rubber (SSBR), emulsion styrene butadiene rubber (ESBR), acrylonitrile butadiene rubber (NBR), chloroprene rubber (CR), halogenated butyl rubber (BIIR, CIIR), and ethylene propylene rubber (EPDM).

7. The vulcanizing process according to claim 1, wherein the hydrophobized silicic acid is silanized.

8. The vulcanizing process according to claim 1, wherein the hydrophobized silicic acid is silanized by a bi- or monofunctional silanizing agent.

9. The vulcanizing process according to claim 1, wherein increasing the total surface area is effected by increasing the amount, or decreasing the size, of the zinc oxide particles, and wherein decreasing the total surface area is effected by decreasing the amount, or increasing the size, of the zinc oxide particles.

10. A process for preparing a vulcanized rubber article comprising the vulcanizing process according to claim 1 and further comprising molding the vulcanizable blend.

\* \* \* \* \*